United States Patent [19]
Peters

[11] Patent Number: 5,860,248
[45] Date of Patent: Jan. 19, 1999

[54] PLANTER HANGER

[76] Inventor: Gladys Peters, 274 Orange Rd., Montclair, N.J. 07042

[21] Appl. No.: 910,525

[22] Filed: Aug. 7, 1997

[51] Int. Cl.⁶ .................................................. A01G 13/00
[52] U.S. Cl. .................................................. 47/67; 47/26
[58] Field of Search ................... 47/67, 39, 79, 47/80, 81, 82, 83, 26

[56] References Cited

U.S. PATENT DOCUMENTS

| | | | |
|---|---|---|---|
| 3,950,637 | 4/1976 | Rodin | 47/26 X |
| 4,063,387 | 12/1977 | Mitchell | 47/67 |
| 4,152,629 | 5/1979 | Raupp | 315/362 |
| 4,463,855 | 8/1984 | Smithers | 47/67 X |
| 4,845,602 | 7/1989 | Lehocki | 47/67 X |
| 5,575,447 | 11/1996 | Griffin | 47/67 X |
| 5,683,762 | 11/1997 | Banschick | 47/41.12 X |

*Primary Examiner*—Michael J. Carone
*Assistant Examiner*—Robert Pezzuto

[57] ABSTRACT

A new planter hanger for hanging a planter thereon. The inventive device includes a base member, a downwardly extending wall member extending around the outer perimeter of the base member, a pair of spaced apart clamping arms for clamping a sound generating device, and a light source provided on the lower surface of the base member. The planter hanger also includes plurality of supporting wire loops on the upper surface of the base member with a supporting wire attached to each supporting wire loop. The upper ends of all of the supporting wires are attached to a hanging ring to allowing suspending of the invention from a structure. A planter may be hung from the lower surface of the base member by a plurality of planter support loops.

16 Claims, 2 Drawing Sheets

PLANTER HANGER

BACKGROUND OF THE INVENTION

1. Field of the Invention

The present invention relates to planter hangers and more particularly pertains to a new planter hanger for hanging a planter thereon.

2. Description of the Prior Art

The use of planter hangers is known in the prior art. More specifically, planter hangers heretofore devised and utilized are known to consist basically of familiar, expected and obvious structural configurations, notwithstanding the myriad of designs encompassed by the crowded prior art which have been developed for the fulfillment of countless objectives and requirements.

Known prior art planter hangers include U.S. Pat. No. 4,055,915; U.S. Pat. No. 5,043,009; U.S. Pat. No. Des. 253,382; U.S. Pat. No. 4,314,646; U.S. Pat. No. 4,244,013; and U.S. Pat. No. Des. 286,917.

While these devices fulfill their respective, particular objectives and requirements, the aforementioned patents do not disclose a new planter hanger. The inventive device includes a base member, a downwardly extending wall member extending around the outer perimeter of the base member, a pair of spaced apart clamping arms for clamping a sound generating device 12, and a light source provided on the lower surface of the base member. The planter hanger 10 also includes plurality of supporting wire loops on the upper surface of the base member with a supporting wire attached to each supporting wire loop. The upper ends of all of the supporting wires are attached to a hanging ring to allowing suspending of the invention from a structure. A plurality of planter support loops on the base member lower surface provide a means for hanging a planter from the base member.

In these respects, the planter hanger according to the present invention substantially departs from the conventional concepts and designs of the prior art, and in so doing provides an apparatus primarily developed for the purpose of hanging a planter thereon.

SUMMARY OF THE INVENTION

In view of the foregoing disadvantages inherent in the known types of planter hangers now present in the prior art, the present invention provides a new planter hanger construction wherein the same can be utilized for hanging a planter thereon.

The general purpose of the present invention, which will be described subsequently in greater detail, is to provide a new planter hanger apparatus and method which has many of the advantages of the planter hangers mentioned heretofore and many novel features that result in a new planter hanger which is not anticipated, rendered obvious, suggested, or even implied by any of the prior art planter hangers, either alone or in any combination thereof.

To attain this, the present invention generally comprises a base member, a downwardly extending wall member extending around the outer perimeter of the base member, a pair of spaced apart clamping arms for clamping a sound generating device 12, and a light source provided on the lower surface of the base member. The planter hanger 10 also includes plurality of supporting wire loops on the upper surface of the base member with a supporting wire attached to each supporting wire loop. The upper ends of all of the supporting wires are attached to a hanging ring to allowing suspending of the invention from a structure. A plurality of planter support loops on the base member lower surface provide a means for hanging a planter from the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new planter hanger apparatus and method which has many of the advantages of the planter hangers mentioned heretofore and many novel features that result in a new planter hanger which is not anticipated, rendered obvious, suggested, or even implied by any of the prior art planter hangers, either alone or in any combination thereof.

It is another object of the present invention to provide a new planter hanger which may be easily and efficiently manufactured and marketed.

It is a further object of the present invention to provide a new planter hanger which is of a durable and reliable construction.

An even further object of the present invention is to provide a new planter hanger which is susceptible of a low cost of manufacture with regard to both materials and labor, and which accordingly is then susceptible of low prices of sale to the consuming public, thereby making such planter hanger economically available to the buying public.

Still yet another object of the present invention is to provide a new planter hanger which provides in the apparatuses and methods of the prior art some of the advantages thereof, while simultaneously overcoming some of the disadvantages normally associated therewith.

Still another object of the present invention is to provide a new planter hanger for hanging a planter thereon.

Yet another object of the present invention is to provide a new planter hanger which includes a base member, a downwardly extending wall member extending around the outer perimeter of the base member, a pair of spaced apart clamping arms for clamping a sound generating device 12, and a light source provided on the lower surface of the base member. The planter hanger 10 also includes plurality of supporting wire loops on the upper surface of the base member with a supporting wire attached to each supporting wire loop. The upper ends of all of the supporting wires are attached to a hanging ring to allowing suspending of the invention from a structure. A plurality of planter support loops on the base member lower surface provide a means for hanging a planter from the base member.

Still yet another object of the present invention is to provide a new planter hanger that allows attachment of a sound generating device.

Even still another object of the present invention is to provide a new planter hanger that includes a light source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
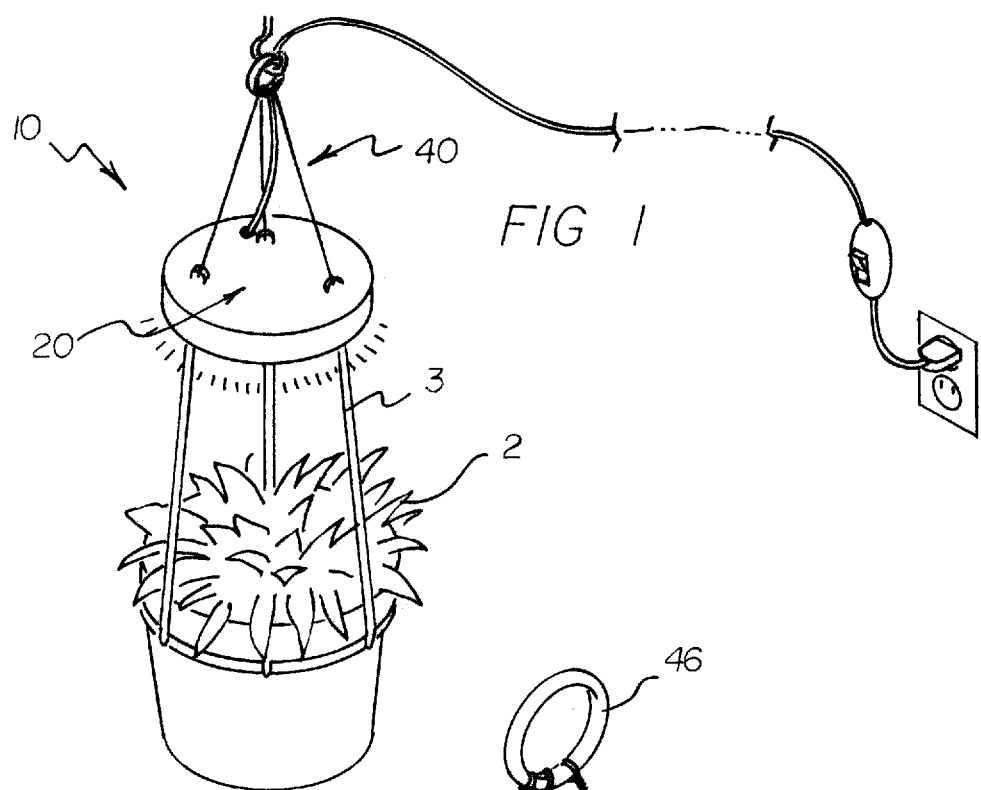
FIG. 1 is a perspective view of a new planter hanger with a planter hanging therefrom according to the present invention.
Figure 2:
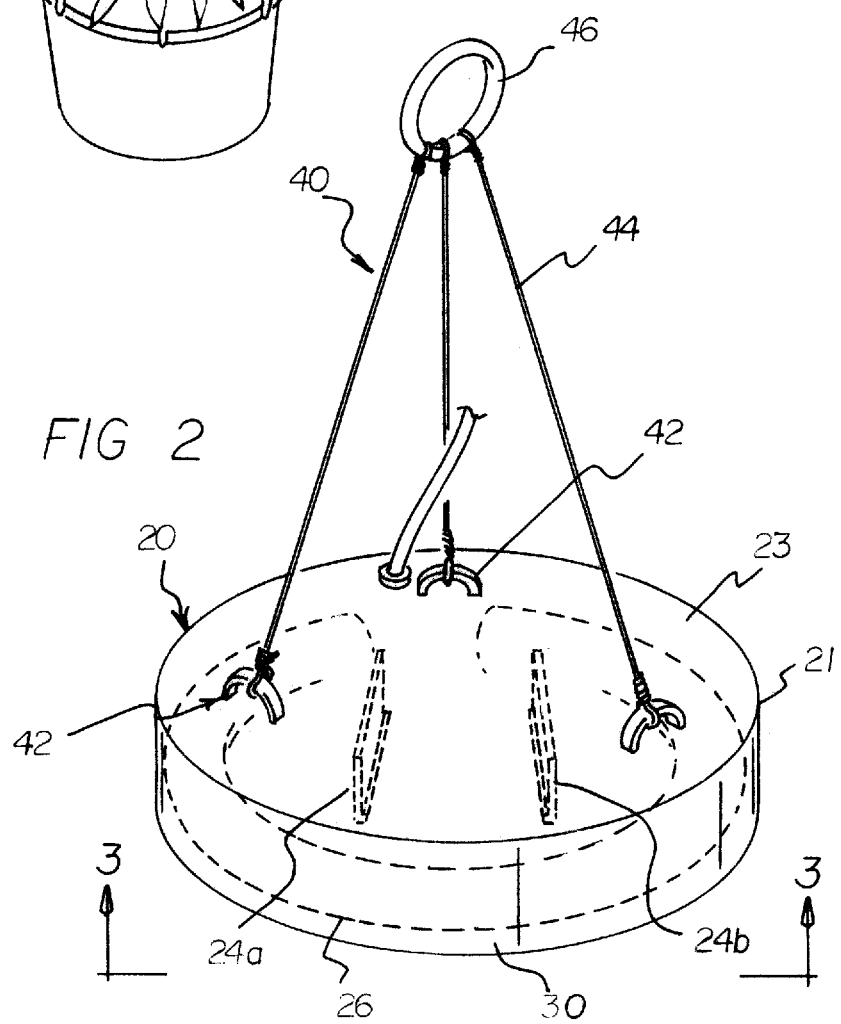
FIG. 2 is a perspective view of the present invention.
Figure 3:
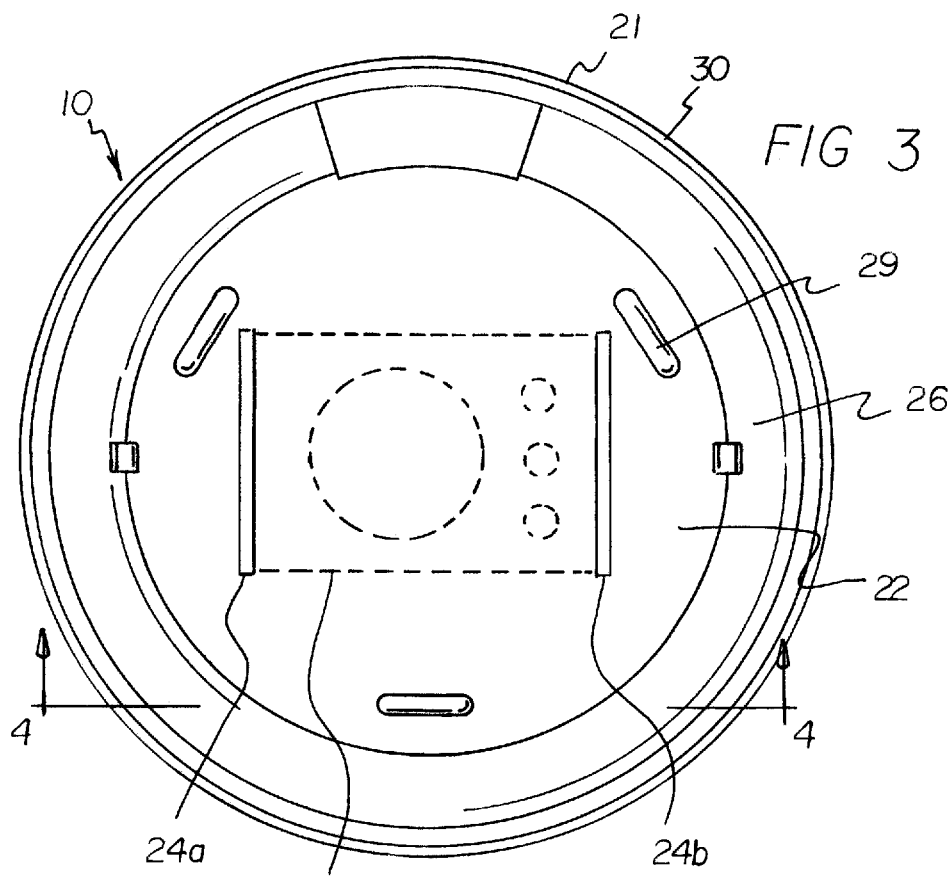
FIG. 3 is a bottom side view of the present invention as viewed from line 3—3 of FIG. 2.
Figure 4:
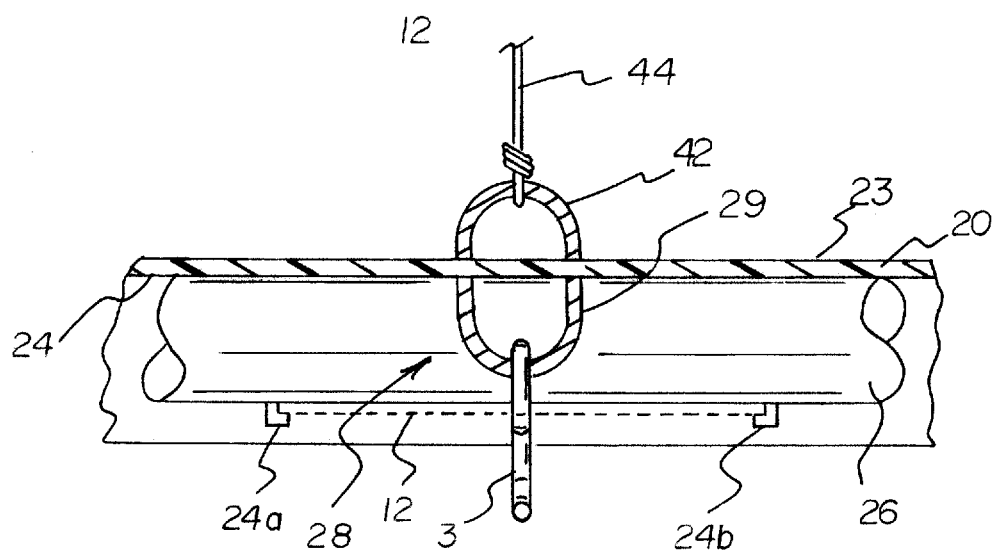
FIG. 4 is a partial sectional view of the present invention taken from line 4—4 on FIG. 3.

With reference now to the drawings, and in particular to FIGS. 1 through 4 thereof, a new planter hanger embodying the principles and concepts of the present invention and generally designated by the reference numeral 10 will be described.

As best illustrated in FIGS. 1 through 4, the planter hanger 10 comprises a base member 20, a downwardly extending wall member 30 extending around the outer perimeter 21 of the base member 20, a pair of spaced apart clamping arms 24a,b for clamping a sound generating device 12, and a light source 26 provided on the 22 lower surface of the base member 20. The planter hanger 10 also includes a suspending means 40 for suspending the base member 20 from a structure 1, and a hanging means 28 for hanging a planter from the base member 20.

Preferably, the base member 20 is disk-shaped and has an outer perimeter 21, a lower surface 22 and an upper surface 23. The ring-shaped wall member 30 extends around the outer perimeter 21 downwards from the base member 20. Ideally, the wall member 30 extends downwards far enough to hide the light source 26 and the clamping arms 24a,b from viewing from the side.

The suspending means 40 is located on the base member upper surface 23. The suspending means 40 functions to suspend the base member 20 from a structure 1. Ideally, the suspending means 40 comprises a plurality of supporting wire loops 42 extended from the upper surface 23 of the base member 20. Attached to each supporting wire loop 42 is the lower end of a supporting wire 44. The upper ends of all of the supporting wires are attached to a hanging ring 46. The hanging ring 46 is designed for hanging on a hook 1 on a structure.

On the base member lower surface 22, is the hanging means 28. The hanging means is designed to permit the hanging a planter 2. from the base member 20. Ideally, the hanging means 28 comprises a plurality of planter support loops 29 extending from the base member lower surface 22. Each of the planter support loops is coupled to an associated supporting wire loop. Each planter support loop 29 is designed to permit attachment of a planter support line 3 to allow the hanging a planter 2.

The base member lower surface 22 also includes a light source 26 depending from it. Ideally the light source 26 is ring-shaped. The light source 26 allows light to shine down on to a planter 2 hanging from the planter hanger 10. Accordingly, as an option, the light source 26 may be fluorescent or a grow light to help plant growth.

Also provided on the base member lower surface 22 is a clamping means 24 for clamping a sound generating device 12 such a portable radio or portable radio cassette player having speakers. This allows music or other sounds to be played from the planter hanger 10. Optionally, instead of a clamping means 24, the planter holder 10 may include a sound generating device permanently attached to the base member lower surface 22.

Ideally, the clamping means comprises a pair of spaced apart clamping arms 24a,b. The clamping arms 24a,b are designed for releasably clamping a portable sound generating device 12 between them to hold the device to the base member lower surface 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A planter hanger for hanging a planter therefrom, comprising:

a base member having an outer perimeter, an upper surface, and a lower surface;

a wall member being extended around said base member outer perimeter and being downwardly extended from said base member;

a suspending means for suspending said base member from a structure;

a hanging means for hanging a planter from said base member a ring shaped light source being provided on said base member lower surface, said light source being for providing light to a planter hanging below said base member;

a clamping means for clamping a sound generating device to said base member lower surface, said clamping means being positioned inside an inner circumference of said light source; and a sound generating means being releasably clamped to said base member lower surface by said clamping means, said sound generating means being for downwardly projecting sound towards a planter hanging from said base member.

2. The planter hanger of claim 1, wherein said clamping means includes a pair of spaced apart clamping arms for clamping a sound generating device therebetween, said clamping arms being downwardly extended from said base member lower surface.

3. The planter hanger of claim 1, wherein said suspending means includes a plurality of supporting wire loops being extended from said base member upper surface.

4. The planter hanger of claim 3, wherein said suspending means further includes a plurality supporting wires each having an upper end and a lower end, each said supporting wire lower end being attached to one of said supporting wire loops.

5. The planter hanger of claim 4, wherein said suspending means further includes a hanging ring for attachment to a structure, and wherein each said supporting wire upper end being coupled to said hanging ring.

6. The planter hanger of claim 3, wherein said hanging means includes a plurality of planter support loops being extended from said base member lower surface, each of said planter support loops being coupled to an associated supporting wire loop, said planter support loops being for attaching a depending planter thereon.

7. The planter hanger of claim 6, wherein each of said planter support loops is formed as a single loop with the associated supporting wire.

8. The planter hanger of claim 1, wherein said suspending means includes a plurality of supporting wire loops being extended from said base member upper surface, said hanging means including a plurality of planter support loops being extended from said base member lower surface, said planter support loops being for attaching a depending planter thereon, wherein said base member has a center, and wherein each of said planter support loops and each of said supporting wire loops are spaced radially outward from said center, wherein each of said planter support loops is positioned at a radial spacing distance substantially equal to the radial spacing distance of each of said supporting wire loops with each of said supporting wire loops being located above one of said planter support loops for minimizing stress on said base member.

9. A planter hanger for hanging a planter therefrom, comprising:

a base member having an outer perimeter, an upper surface, and a lower surface;

a wall member being extended around said base member outer perimeter and being downwardly extended from said base member;

a suspending means for suspending said base member from a structure;

a hanging means for hanging a planter from said base member a ring shaped light source being provided on said base member lower surface, said light source being for providing light to a planter hanging below said base member; and a sound generating means being provided on said base member lower surface for downwardly projecting sound towards a planter hanging from said base member, said sound generating means being positioned inside an inner circumference of said light source.

10. The planter hanger of claim 9, wherein said suspending means includes a plurality of supporting wire loops being extended from said base member upper surface.

11. The planter hanger of claim 10, wherein said suspending means further includes a plurality supporting wires each having an upper end and a lower end, said supporting wire lower ends being attached to said supporting wire loops.

12. The planter hanger of claim 11, wherein said suspending means further includes a hanging ring for attachment to a structure, and wherein each said supporting wire upper end being coupled to said hanging ring.

13. The planter hanger of claim 10, wherein said hanging means includes a plurality of planter support loops being extended from said base member lower surface, each of said planter support loops being coupled to an associated supporting wire loop, said planter support loops being for attaching a depending planter thereon.

14. A planter hanger for hanging a planter therefrom, comprising:

a disk-shaped base member having an outer perimeter, an upper surface, and a lower surface;

a ring-shaped wall member being extended around said base member outer perimeter and being downwardly extended from said base member;

a plurality of supporting wire loops being extended from said base member upper surface;

a hanging ring being for attachment to a structure;

a plurality of supporting wires each having an upper end and a lower end, said supporting wire lower ends being attached to said supporting wire loops, each said supporting wire upper end being coupled to said hanging ring;

a ring shaped light source being depended from said base member lower surface for shining light on a planter therebelow;

a plurality of planter support loops being extended from said base member lower surface, wherein each of said planter support loops is formed as a single loop with the associated supporting wire; said planter support loops being for attaching a depending planter thereon;

wherein said base member has a center, and wherein each of said planter support loops and each of said supporting wire loops are spaced radially outward from said center;

wherein each of said planter support loops is positioned at a radial spacing distance substantially equal to the radial spacing distance of each of said supporting wire loops with each of said supporting wire loops being located above one of said planter support loops for minimizing stress on said base member, each of said planter support loops being coupled to an associated supporting wire loop;

a pair of spaced apart clamping arms for releasably clamping a portable sound generating device therebetween, said clamping arms being downwardly extended from said base member lower surface; and a sound generating means being releasably clamped to said base member lower surface by said clamping means, said sound generating means being for projecting sound downwardly towards a planter hanging from said base member.

15. The planter hanger of claim 14, wherein said sound generating means includes a radio.

16. The planter hanger of claim 15, wherein said sound generating means includes an audio cassette player.

* * * * *